United States Patent [19]

Ishimaru et al.

[11] Patent Number: 5,432,710
[45] Date of Patent: Jul. 11, 1995

[54] ENERGY SUPPLY SYSTEM FOR OPTIMIZING ENERGY COST, ENERGY CONSUMPTION AND EMISSION OF POLLUTANTS

[75] Inventors: Kimio Ishimaru, Nara; Akio Nakashiba, Katano; Masahiro Koga, Kawasaki; Hisao Ohnishi, Osaka; Hideaki Kawahara, Yao, all of Japan

[73] Assignee: Osaka Gas Company Limited, Osaka, Japan

[21] Appl. No.: 38,481

[22] Filed: Mar. 29, 1993

[30] Foreign Application Priority Data

Apr. 6, 1992 [JP] Japan .................................. 4-114014
Jan. 25, 1993 [JP] Japan .................................. 5-029966

[51] Int. Cl.⁶ .......................... H02J 11/00; H02J 4/00; G06F 19/00
[52] U.S. Cl. ..................................... 364/493; 364/492; 364/494
[58] Field of Search ............... 364/492, 493, 494, 495, 364/464.01, 464.04; 60/517; 290/2

[56] References Cited

U.S. PATENT DOCUMENTS

| | | | |
|---|---|---|---|
| 4,341,067 | 7/1982 | Tison | 204/129 |
| 4,680,478 | 7/1987 | Wicks | 290/2 |
| 4,752,697 | 6/1988 | Lyons et al. | 290/2 |
| 4,802,100 | 1/1989 | Aasen et al. | 364/492 X |
| 5,074,114 | 12/1991 | Meijer et al. | 60/517 |
| 5,159,562 | 10/1992 | Putman et al. | 364/494 |

FOREIGN PATENT DOCUMENTS

3933284 4/1991 Germany .
2245453 10/1990 Japan .
5065807 3/1993 Japan .

OTHER PUBLICATIONS

"The Tokyo Electric Power Company (TEPCO) fuel cell evaluation program" By Kunio Shibata, in Journal of Power Sources, vol. 37, No. ½, (1992), pp. 81-99.
European Search Report in EP 93 10 5681.

Primary Examiner—Edward R. Cosimano
Assistant Examiner—M. Kemper
Attorney, Agent, or Firm—Varndell Legal Group

[57] ABSTRACT

An energy supply system for supplying, in system interconnection, power received at a power receiving equipment from a power plant and power generated by a fuel cell to a power consuming installation, and supplying heat generated by the fuel cell to a heat consuming installation. This system includes an operation amount computing device for computing an amount of operation of the fuel cell to minimize an equation $y = aXL + bXM + cXN$, in response to an energy demand of the power consuming installation and heat consuming installation. A control device controls the fuel cell to satisfy the amount of operation computed. The system supplies energy in optimal conditions with respect to the cost borne by an energy consumer, consumption of primary energy, and release of environmental pollutants. Energy is effectively used from the standpoint of the energy consumer and a national point of view.

47 Claims, 6 Drawing Sheets

ENERGY SUPPLY SYSTEM FOR OPTIMIZING ENERGY COST, ENERGY CONSUMPTION AND EMISSION OF POLLUTANTS

BACKGROUND OF THE INVENTION

1. Field of the Invention

The present invention relates to an energy supply system for supplying energy in an optimal condition to energy consumers for consumption of heat and electricity in heating water, cooking, lighting, cooling and heating spaces, and operating apparatus and equipment for various other purposes.

2. Description of the Prior Art

In supplying heat and electricity as noted above, heat is produced mainly by burning a gas while electricity is transmitted from power plants. With the diffusion of air-conditioners, the demand for commercial electricity reaches its maximum during the hours from 11:00 to 17:00 in summer. Electric power companies must install power generating equipment and transmitting equipment to meet the peak power demand during such a short time in such a brief period of the year.

However, difficulties have been encountered in building new power plants in that local communities tend to oppose thermal power plants mainly on the grounds of the problem of pollution, and nuclear power plants mainly from the safety point of view. Power use patterns fluctuate throughout the year, with the consumption maximizing during a limited period of time in summer. Even if new power plants are built, the annual availability factor is very low. Consequently, it is uneconomical since new power plants will have an extremely low use efficiency for the plant investment required.

On the other hand, the demand for town gas reaches its maximum in winter and its minimum in summer. Town gas companies must install production equipment and supply equipment to meet the maximum demand in winter. Such equipment suffers a very low availability factor through the year, particularly in summer.

Thus, there is a need for development of an energy supply system, which will allow power companies and town gas companies to make effective use of their respective facilities.

Systems for supplying energy to such energy consumers who consume heat and electricity include what is known as a cogeneration system. The cogeneration system supplies commercial electric power (the power supplied from power suppliers for payment), the power obtained by driving a generator with a gas engine or gas turbine, and the waste heat from these machines.

The above cogeneration system has a high energy use efficiency to provide the advantages of low energy cost, reduced contract demand and leveled quantity of electricity. However, only an operation to minimize fuel consumption or a rated operation has been kept in view in driving the generator with the gas engines or gas turbines. The system has not been run, taking efficiency of the entire system into account, or from a national point of view.

SUMMARY OF THE INVENTION

The present invention has been made having regard to the state of the art noted above. An object of the present invention, therefore, is to provide an energy supply system which makes effective use of energy and takes preservation of the environment into account from a consumers' standpoint as well as a national point of view.

Other objects of the invention will be apparent from the following description.

The above object is fulfilled, according to the present invention, by an energy supply system having a power receiving means for receiving electric power from a power plant, an in-system power generating means for generating power and heat by using at least some fuel received at a fuel receiving means, a power supplying means for supplying, in system interconnection, the power received at the power receiving means and the power generated by the in-system power generating means to a power consuming installation, and a heat supplying means for supplying the heat generated by the in-system power generating means to a heat consuming installation. The energy supply system comprises an amount of operation computing device for computing an amount of operation of the in-system power generating means to minimize an equation "y" set out hereunder when meeting an energy demand of an energy consumer, and a control means for controlling the in-system power generating means to satisfy the amount of operation computed by the amount of operation computing device;

$$y = a\,XL + b\,XM + c\,XN,$$

where

"a", "b" and "c" are weighting coefficients $a \geq 0$, $b \geq 0$ and $c \geq 0$, which do not become zero at the same time, the coefficients "a", "b" and "c" being determinable by an assessor according to a selected mode of assessment, but a XL, b XM and c XN being impossible to assess without being placed in the order as in the embodiment since "L", "M" and "N" are different in order and unit, "L" is an energy cost borne by the energy consumer when the energy demand is met, "M" is a calculated total quantity of primary energy consumed to meet the energy demand, and "N" is a calculated total quantity of environmental pollutants released when the energy demand is met.

With the energy supply system according to the present invention, the control means controls the in-system power generating device to operate in an optimal condition with respect to the cost borne by the energy consumer, consumption of primary energy, and release of environmental pollutants. In this way, the energy consumer requiring heat and electricity is supplied with a necessary quantity of heat and an appropriate quantity of electricity. In the process of supplying the heat and power, the power obtained through generation of the heat is added to the power received from the power plant. Thus, with the energy supply system according to the present invention, the in-system power generating means is operable in an optimal condition with respect to the cost borne by the energy consumer, consumption of primary energy, and release of environmental pollutants, to supply heat and power to the energy consumer. This system is capable of a comprehensive improvement in energy efficiency not only with the in-system power generating means but with addition of commercial electricity. This system lightens the burden on the energy consumer, lessens the necessity for new generating and transmitting facilities, and reduces release of environmental pollutants. That is, this energy supply system realizes effective use of energy from the standpoint of the energy consumer and from a national point of view, while contributing toward preservation of the environment.

The energy supply system according to the present invention may further comprise an in-system heat generating means besides the in-system power generating means, wherein the heat generated by the in-system heat generating means also is supplied to the heat consuming installation.

The in-system heat generating means is operable to supply heat in the event of a regular or temporary increase in the heat demand. This allows the in-system power generating means to have a reduced size, thereby enabling an economical system design and operation.

The heat generated by the in-system heat generating means is used when the heat demand increases temporarily and the heat load of the heat consuming installation exceeds the quantity of heat available from the in-system power generating means. This is economical in that a small in-system power generating device is sufficient, instead of necessitating an in-system power generating means capable of meeting a maximum heat demand.

The energy supply system according to the present invention may further comprise a combustible gas receiving means, wherein a customer heat consuming installation is provided as an energy consuming installation of the energy consumer to use as a heat source a combustible gas received at the combustible gas receiving means and/or the power or the heat, the energy demand including a demand of the customer heat consuming installation.

With this construction, the system may be optimized from economic and national points of view also where the energy consumer has a consuming installation which directly uses a combustible gas as a heat source.

Where the energy consumer has an energy consuming installation adapted to use power, heat and combustible gas, an optimal amount of operation of the in-system power generating means may be computed after determining a priority order of use.

Then, the in-system power generating means is operated in the computed optimal amount. The energy consuming installations of the energy consumer are driven under this condition and under central control (a local control being possible where little load variation occurs).

Thus, the optimization may include the energy consuming installations adapted to use power and heat as well.

The consumption of primary energy refers to consumption at the power plant, the in-system power generating means, and combustible gas consuming equipment (excluding the in-system power generating means) to meet the energy demand of the energy consumer. The combustible gas consuming equipment refers generally to equipment such as a boiler or other in-system heat generating means (not including the in-system power generating means) and the energy consumer's dryer or other customer heat consuming installation that consumes a combustible gas. However, these pieces of equipment may be replaced with the customer heat consuming installation for the sake of simplicity.

The electric power consuming installation refers to an installation that uses AC and/or DC.

The heat consuming installation refers to an installation that uses warm water and/or steam. Warm water and/or steam are used for directly supplying warm water or as heat source for heating spaces or for an absorption heater/cooler, or as heat source for chemical or mechanical equipment.

The energy demand refers to demands for electric power and heat. The energy demand may be determined by a well-known method. That is, electric power may be measured with a wattmeter. Heat may be measured by $W \times (lo-lr)$ in the case of a recirculating system where a warm fluid is supplied from a fuel cell means and returned thereto after its heat is radiated from a heat consuming installation.

In the above expression, "W" is a flow rate of the warm fluid (kg/h), and "l" is an enthalpy (kcal/kg). If the fluid undergoes no phase change and no change in specific heat "C" (kcal/kg° C.), $W \times C \times (To-Tr)$, where "T" is a temperature (° C.), is established. The subscript "o" represents an output from the energy supply system, and the subscript "r" a return from the energy supply system.

Primary energy includes fossil energy such as LNG (liquefied natural gas), coal and petroleum, atomic energy such as uranium, and hydraulic energy from a hydropower generating plant.

Where only fossil fuels such as LNG, naphtha, heavy oil and coal are considered, and a plurality of such fuels are used, "M", or consumption of primary energy, may be evaluated in terms of one of the fuels. The conversion may be based on calories, weighting according to fuel qualities, or purchase prices. When evaluating nuclear power generation also, a fissionable material may be converted for equivalence to LNG with respect to cost or the like. Selection of the fuel for use in the evaluation is arbitrary. Primary energy consumption at a hydropower generating plant normally is negligible.

"N", or environmental pollutants, may be exemplified by $CO_2$, $NOx$ and $SOx$. Assessment thereof may be made by $N = W1[CO_2] + W2[NOx] + W3[SOx]$, where $W1$, $W2$ and $W3$ are weighting coefficients. When only $CO_2$ is considered, the coefficients may be $W1=1$, $W2=0$ and $W3=0$. When only $NOx$ is considered, the coefficients may be $W1=0$, $W2=1$ and $W3=0$. When only $SOx$ is considered, the coefficients may be $W1=0$, $W2=0$ and $W3=1$. The pollutant for use in the assessment may be selected according to circumstances.

The system may be constructed and controlled with the above expression "y" modified as $y=aXL$, i.e. taking only energy cost into account. In this case, heat and electricity may be supplied to the energy consumer to meet its energy demand in such a way as to minimize the cost borne by the energy consumer.

Thus, it is exceedingly economical in that the energy demand is met with a minimum cost borne by the energy consumer.

The system may be constructed and controlled with the above expression "y" modified as $y=bXM$, i.e. taking only a total consumption of primary energy into account. In this case, heat and electricity may be supplied to the energy consumer to meet its energy demand in such a way as to minimize a calculated total quantity of primary energy consumption including quantities of primary energy consumed at the power plant, in-system power generating means and combustible gas consuming equipment.

Since the energy demand is met in such a way as to minimize a calculated total quantity of primary energy Consumption including quantities of primary energy consumed at the power plant, in-system power generating means and the like, energy sources and other resources may be saved significantly at the national level.

The system may be constructed and controlled with the above expression "y" modified as $y=cXN$, i.e. taking only a total release quantity of environmental pollutants into account. In this case, heat and electricity may be supplied to the energy consumer to meet its energy demand in such a way as to minimize a calculated total quantity of environmental pollutants including quantities of environmental pollutants released from the power plant, in-system power generating means and combustible gas consuming equipment.

Since the energy demand is met in such a way as to minimize a calculated total quantity of environmental pollutants including quantities of environmental pollutants released from the power plant, in-system power generating means and the like, environmental pollution may be prevented on global scale.

The system may be constructed and controlled with regard to $y=aXL+bXM$, $y=bXM+cXN$, or $y=aXL+cXN$. These are all special cases included in the invention considering $y=aXL+bXM+cXN$. In these special cases, $y=aXL+bXM+cXN$ may be set to the system, with zero assigned to an unnecessary coefficient or coefficients, or an expression not including an unused term may be stored in memory in advance.

The in-system power generating means may comprise a fuel cell means for producing electric power and heat, or an apparatus for producing power and heat by using a gas engine or gas turbine to drive a generator.

The fuel cell means may be the phosphate type, solid electrolyte type or fused carbonate type. The phosphate type, which causes a reaction between hydrogen and oxygen, has already been put to practical use and may be applied directly to this system.

Normally, this in-system power generating means is installed adjacent to a site of energy consumption by the energy consumer.

In recent years, progress has been made in the research on the phosphate type fuel cell means which uses hydrogen and oxygen as raw materials to output electric power and waste heat. A fuel cell means outputting approximately 200 kw has reached the stage of practical use. With respect to input energy, the power plant is about 40% efficient, while the fuel cell means has a power generating efficiency of about 40% and a heat generating efficiency of about 40%. Thus, the fuel cell means is attracting attention as a new energy supply system. With the fuel cell means used as the in-system power generating means, the energy consumer may be supplied with the heat obtained from the fuel cell means and the power obtained from the fuel cell means and power plant.

Where the in-system power generating means uses a gas engine or gas turbine to drive a generator for generating power and heat, its main component is the gas engine or gas turbine which has a rough and severe drive. This gives rise to the a number of disadvantages such as its operation requires careful attention, its maintenance requires skill, its generating efficiency is low, and it produces NOx. These disadvantages are diminished where a fuel cell means is used as the in-system power generating means as noted above. In addition, the fuel cell means produces water from the reaction between hydrogen and oxygen, and this water may also be used to advantage.

The energy supply system may further comprise a heat storage means for storing, in the form of warm water, superfluous heat generated by the in-system power generating means, and a heat replenishing means for supplying the heat stored in the storage means to the heat consuming installation at a time of heat shortage. Where a rated capacity of the in-system power generating means is determined from a heat load, the in-system power generating means may have a reduced rated capacity since the heat load is leveled.

Thus, the heat made superfluous at normal times may be stored for use when the heat demand temporarily increases. This is economical in that a small in-system power generating means is sufficient, instead of necessitating an in-system power generating means capable of meeting a maximum heat demand.

Heat shortages may be covered by thermal conversion of superfluous electric power, such as by using a heater or other electricity-to-heat converting means.

Then, the heat obtained from the thermal conversion of superfluous power by the electricity-to-heat converting means is supplemented when the heat demand temporarily increases and the heat load of the heat consuming equipment becomes greater than the heat available from the in-system power generator means. This is economical in that a small in-system power generating means is sufficient, instead of necessitating an in-system power generating means capable of meeting a maximum heat demand. The energy supply system may further comprise a power storage means for storing the power supplied from the power receiving means or part of the power generated by the in-system power generating means at a time of low power demand, and a power replenishing means for supplying the power stored in the power storage means to the power consuming installation. This enables leveling of a demand for commercial electricity. Where a rated capacity of the fuel cell means is determined from a power load, the fuel cell means may have a reduced rated capacity.

Thus, the power stored in the power storage means may be used to compensate for a shortage when the power demand temporarily increases. This is economical in that sufficient power to meet a maximum power demand need not be received at the power receiving means, thereby achieving a reduced contract demand.

The energy supply system may further comprise a back-current means for causing a back current of part of the power generated by the in-system power generating means to the external power plant when the power generated by the in-system power generating means exceeds a power demand. With this construction, when heat is in great demand and superfluous power is generated by the in-system power generating means, the power may be transmitted in the back current to the external power plant for effective use. This improves the energy efficiency of the entire system to contribute toward promotion of the national economy.

Hydrogen gas may be received at a fuel gas receiving means to be used as the fuel for the fuel cell means. However, it is more economical to receive a hydrocarbon fuel (e.g. methane, propane or butane) at the fuel receiving means, and produce hydrogen gas therefrom at a reformer means to be used as the fuel for the fuel cell means.

When the hydrocarbon fuel is used to operate the fuel cell means, hydrogen gas may be obtained from the reformer means be used as the fuel for the fuel cell means. Thus, it is sufficient to supply the hydrocarbon fuel for operation of the fuel cell means, which promotes applicability.

The energy supply system may further comprise a gas storage means for storing at least hydrogen gas generated along with oxygen gas through an electrolysis of water carried out by using superfluous power when the fuel cell means is driven in a high-load condition to meet a thermal demand though electric power is superfluous. The hydrogen gas stored may be supplied to the fuel cell means.

Where a hydrocarbon fuel is received as the fuel for the fuel cell means, this may be used as a raw material for producing hydrogen gas at the reformer means. The hydrogen gas produced may be supplied to the fuel cell means.

Then, the hydrogen gas generated by superfluous power may be stored in the gas storage means to be used as the fuel for the in-system power generating means. This allows a reduced quantity of fuel to be received at the fuel receiving means, thereby saving resources.

The hydrogen gas produced by reforming hydrocarbon may be stored for use at high load times.

The energy supply system may further comprise a solar cell connected to the power consuming installation. Thus, power obtained therefrom may be supplied to the power consuming installation.

Since the power obtained from the solar cell is supplied to the power consuming installation, a significant reduction is achieved in the quantity of power received at the power receiving means and in the quantity of power to be obtained from the in-system power generating means.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

DETAILED DESCRIPTION OF THE PREFERRED EMBODIMENTS

Figure 1:
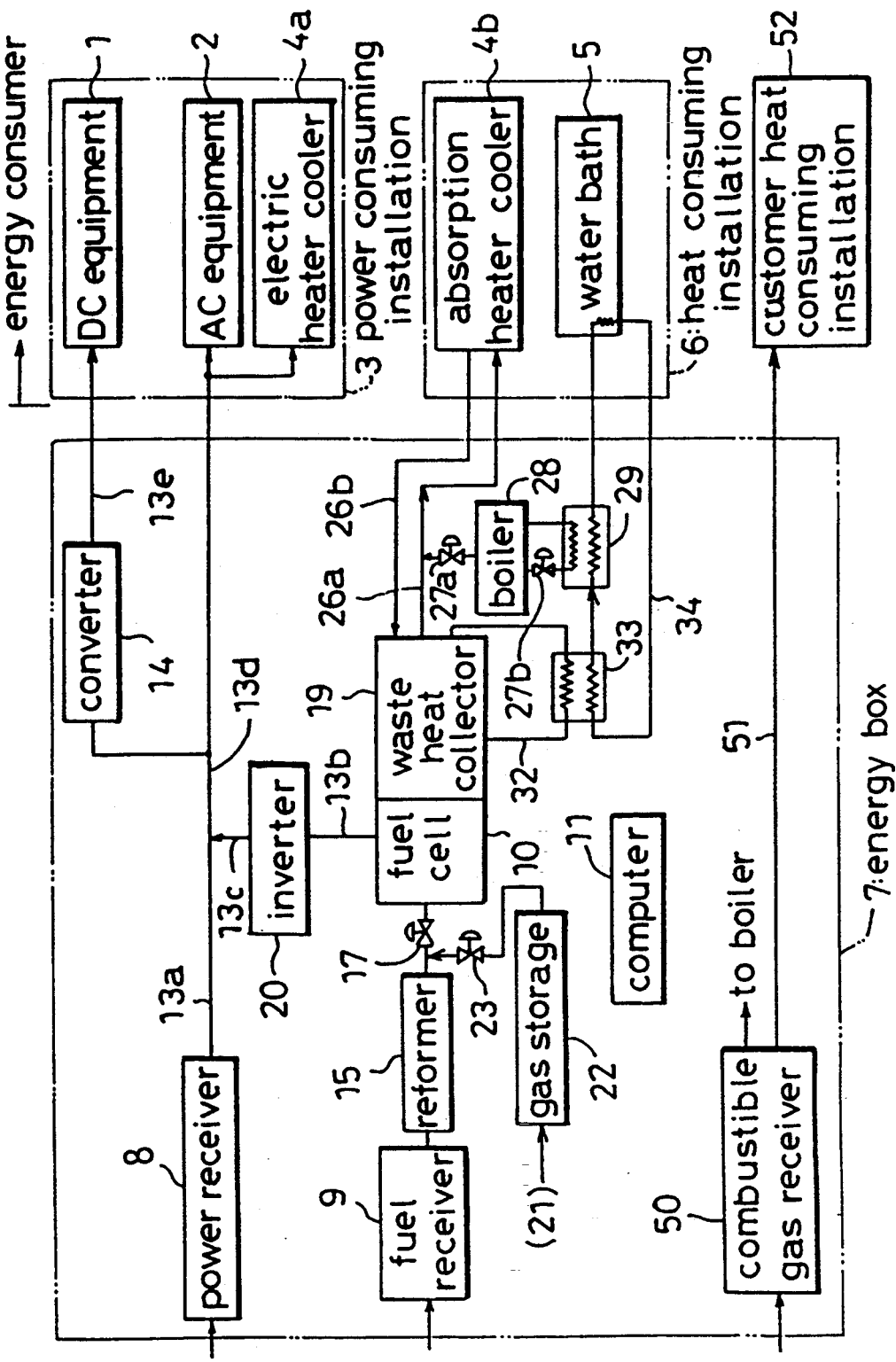
FIG. 1 is a block diagram of an energy supply system according to the present invention.

The present invention for supplying energy in an optimal manner will be described with reference to an embodiment as illustrated in the drawings. However, the technical scope of the invention is not limited to this embodiment.

Referring to the block diagram in FIG. 1, an energy consumer has an electric power consuming installation 3 including a group of DC equipment 1, a group of AC equipment 2, and an electric heater/cooler 4a which is one type of AC equipment; a heat consuming installation 6 including an absorption heater/cooler 4b and a water bath 5; and a customer heat consuming installation 52 such as a dryer using a combustible gas, power or heat as a heat source. Energy is supplied to the consumer from an energy box 7 having an energy supply system according to the present invention.

The energy box 7 herein refers to a combination of a piece of power receiving means 8, a fuel receiving means 9, an in-system power generating means 10 such as a fuel cell means, an in-system heat generator such as a boiler, a computer 11 acting as a computing means, and a control means which combination forms the core of the present invention. These equipment or means are not necessarily contained in a box or a chamber.

Electricity is transmitted from an external power plant to the power receiving means 8 having a wattmeter (not shown), a circuit breaker and the like. The group of AC equipment 2 is connected to the power receiving means 8 through system wiring 13a and 13d. The group of DC equipment 1 is connected to the power receiving means 8 through a system wiring 13e having an AC-to-DC converter 14.

Town gas having methane as its main component is received at the fuel receiving means 9 having a gas meter (not shown), a cutoff valve and the like. The town gas received is reformed into hydrogen gas by using water vapor in the presence of a catalyst. The town gas may be used also as a fuel for heating a reformer means 15 and as a boiler fuel as described hereinafter. The hydrogen gas obtained is supplied to a fuel electrode of the fuel cell means 10 through a flow regulator valve 17. The fuel cell means 10 receives air at an air electrode thereof from an air blower (not shown). The fuel cell 10 generates electricity through a reaction between hydrogen and oxygen. At the same time, water is collected (though not shown) while heat is collected in the form of warm water and/or vapor by an waste heat collector 19.

The fuel cell means 10 has an output wiring 13b connected to a DC-to-AC inverter 20. The inverter 20 is connected through a system wiring 13c to the system wiring 13a. Thus, the power output of the fuel cell means 10 is in system interconnection with the power received by the power receiving means 8. This provides a power supplying means for supplying the power generated by the fuel cell means 10 to the power consuming installation 3. The power output of the fuel cell means 10 may be supplied to the DC consuming equipment without passing it through the inverter.

This system interconnection, when the power generated by the fuel cell means 10 exceeds a power demand of the power consuming installation 3, allows part of the power generated by the fuel cell means 10 to be flowed back to a commercial power supplier.

At times of low power demand, superfluous power may be used in electrolysis of water to generate hydrogen gas and oxygen gas. This hydrogen gas may be stored in a gas storage means 22 to be used as a fuel for the fuel cell means 10. This is effective when it is difficult to operate the fuel cell means 10 under a low load condition or when the back-current means to the power supplier is difficult for various reasons.

Further, a power storage (not shown) may be connected to the output wiring 13b to store superfluous power for use at times of power shortage. The waste heat collector 19 and absorption heater/cooler 4b are interconnected through a vapor collecting piping 26a and a condensed water return piping 26b. Thus, heating and cooling are effected by means of the vapor obtained from the waste heat collector 19. A boiler 28 is connected to the vapor collecting piping 26a through a second control valve 27a. Thus, when a heat load of the absorption heater/cooler 4b forming part of the heat consuming installation 6 is greater than a quantity of heat produced from the fuel cell means 10, compensation may be made for the heat shortage.

The waste heat collector 19 has a warm water collecting piping 32 including a second heat exchanger 33. The water bath 5 is connected to a secondary piping 34 connected to a first heat exchanger 29 and the second heat exchanger 33. Thus, the vapor and warm water obtained from the waste heat collector 19 may be used to supply high-temperature water.

An electricity-to-heat converting means such as a heater may be used, when the heat load of the heal consuming installation 6 is greater than the quantity of heat produced from the fuel cell means 10, to compensate for the heat shortage with the superfluous power or with thermal conversion of the power received at the power receiving means 8.

A heat storage (not shown) may be provided for the waste heat collector 19 to store superfluous heat produced from the fuel cell means 10. This provides a heat replenishing means for supplying the heat stored in the heat storage to the heat consuming installation 6 at times of heat shortage.

Further, part of the heat output of the boiler 28 may be stored for use at times of heat shortage.

The system wiring 13b may receive electricity generated by a solar cell (not shown) and a wind power generator (not shown).

The energy consumer has the customer heat consuming installation 52 using a combustible gas as a heat source. Where this customer heat consuming installation 52 is a dryer or the like adapted to use electricity and heat as heat sources also, the system may be constructed to supply electricity and heat to the customer heat consuming installation 52 along with the combustible gas supplied from a combustible gas receiving means 50 through a piping 51. Then, the least costly energy may be used in accordance with operating conditions, or the entire system including the customer heat consuming installation 52 may be operated with an objective function "y" set to an optimal condition.

The combustible gas received at the combustible gas receiving means 50 may be used as a fuel for the boiler 28 and as a combustion gas for the reformer means 15. Where this combustible gas is the same as the fuel received at the fuel receiving means 9 (e.g. town gas having methane as the main component), one of the fuel receiving means 9 and the combustible gas receiving means 50 may act also as the other to allow omission of the latter.

Figure 2:
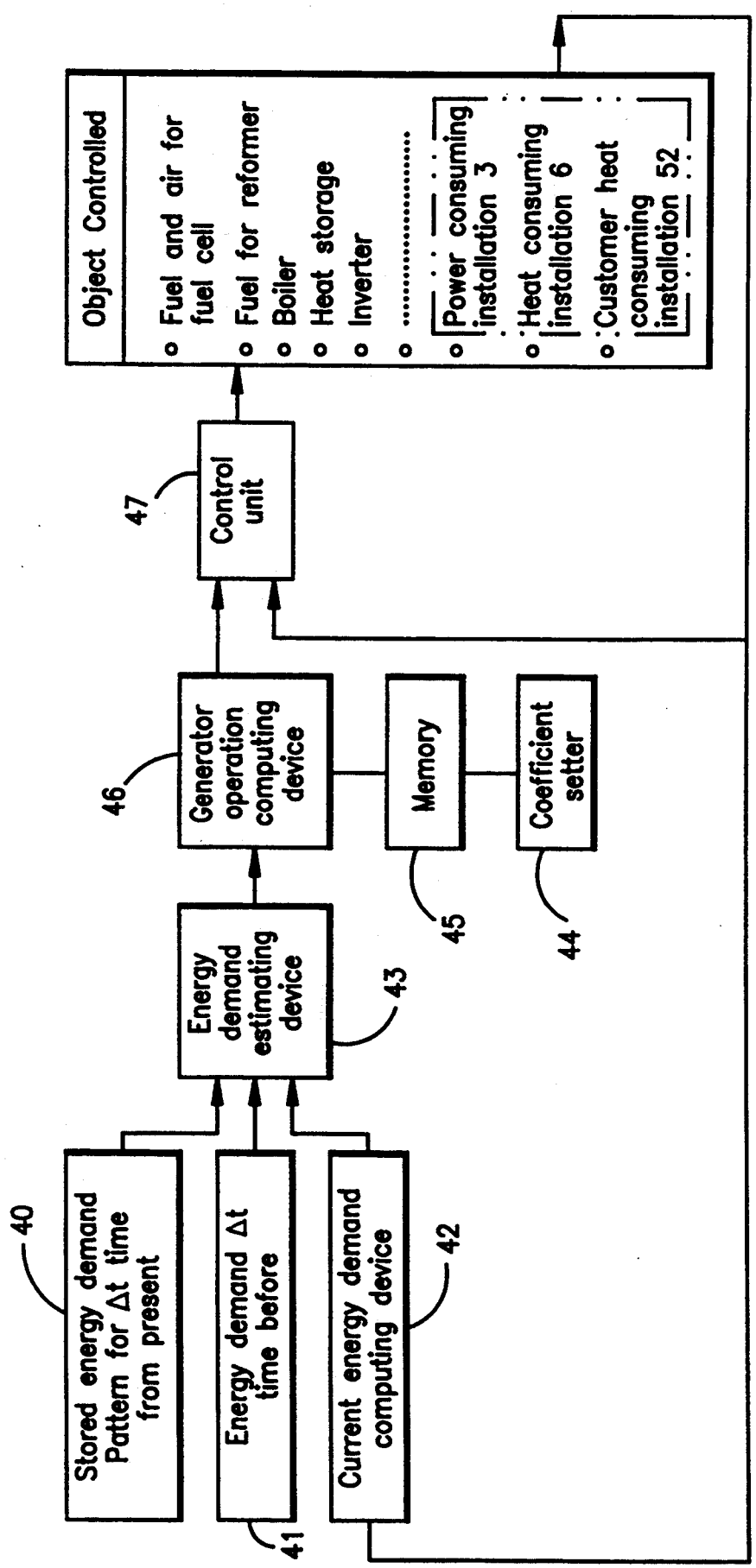
FIG. 2 is a block diagram of a control means.

FIG. 2 is a block diagram showing a control system. The load of the in-system generator may be determined by the following methods:

(1) A method in which a load for minimizing the objective function "y" is determined beforehand by macroscopically seeing operations over a unit time (e.g. one day), and the system is run under the load determined. Variations in power load are dealt with by means of electricity intake, and those in heat load by means of the boiler.

(2) A method in which a power load and a heat load measured are stored in a memory, and rates of change are determined from the power load and the heat load a unit time before (e.g. 30 minutes before) and a current power load and a current heat load, to estimate an energy demand for a next unit time. Operating conditions to meet the estimated demand and minimize an objective expression "y" are determined, and the system is run under these conditions for the next unit time.

(3) A method in which an energy demand pattern at every hour of a past period (e.g. the previous day, or one week before), and an energy demand for a next unit time (e.g. 30 minutes) is estimated from the demand pattern and based on a current energy demand. Operating conditions to meet the estimated demand and minimize the objective expression "y" are determined, and the system is run under these conditions for the next unit time.

Controls by the method (2) above will be described with reference to FIG. 2.

An energy demand estimating device 43 estimates an energy demand occurring $\Delta t$ time from now, from a current energy demand of the power consuming installation 3, heat consuming installation 6 and customer heat consuming installation 52 measured and computed by an energy demand computing device 42, an energy demand 41 the $\Delta t$ time before, and an energy demand pattern 40 for the $\Delta t$ time (control unit time) from now as stored in a memory 45. The estimated energy demand is input to a computing device 46 for computing an amount of operation of the fuel cell means 10 acting as the in-system generator, to minimize the objective function "y" under the condition of the estimated energy demand. A control unit 47 controls the fuel flow regulator valve 17 connected to the fuel cell 10, and controls and selects the type of energy (electricity, heat or combustible gas) used by each energy consuming installation of the energy consumer. These devices are operable under remote control by the computer 11 using a communication line. Coefficients "a", "b" and "c" are set through a coefficient setter 44 to meet the demand of the energy consumer. The memory 45 stores an objective function $y = aXL + bXM + cXN$.

The operating conditions, i.e. cost minimum, primary energy minimum, and environmental pollutant minimum, or any combination thereof, may be determined prior to operation of the system and may be changed during operation.

The coefficients "a", "b" and "c" may be manually set or changed through the coefficient setter 44 which may be included in the energy box 7. Alternatively, signals may be transmitted through a communication line to the coefficient setter 44 from outside the energy box 7 or the system to set or change these coefficients.

When NOx level exceeds a reference level in or around a location of energy consumption, for example, it is conceivable to change, upon a governmental order, to an operation for environmental pollutant minimum, and especially NOx minimum.

The amount of operation computing device 46 computes an amount of operation of the fuel cell means 10 $\Delta t$ from now to minimize the expression "y", based on the energy demand estimated by the energy demand estimating device 43 of the power consuming installation 3, heat consuming installation 6 and customer heat consuming installation 52 as well as the expression "y" stored in the memory 45.

The control unit 47 controls the fuel flow regulator valve 17 and other components to secure the amount of operation of the fuel cell means 10 computed by the amount of operation computing device 46.

There inevitably occurs an error between estimated energy demand and actual consumption. Where this error occurs with the heat consuming installation 6, for example, and where the heat piping 34 is maintained at a fixed return temperature, the control unit 47 may be operated in response to a decrease in the return temperature, to open the fuel flow regular valve 17 to a larger extent or to open the fuel valve of the boiler 28 to a larger extent for an increased boiler output.

Such an arithmetic operation and storage are carried out by the computing means 11.

With the foregoing construction, the fuel cell means 10 may be operated in an optimal condition with respect to energy efficiency, in response to the energy demand of the power consuming installation 3 and heat consuming installation 6.

In the above embodiment, the expression "y" providing the objective function is $y=aXL+bXM+cXN$. It is also in accordance with the present invention to employ $y=aXL$, $y=bXM$, $y=cXN$, $y=aXL+bXM$, $y=aXL+cXN$, or $y=bXM+cXN$.

<COMPARATIVE EXPERIMENT>

Comparative experiment carried out on the energy supply system according to the present invention will be described next.

The experiment has been based on the following premises:

(1) The external energy received by the energy box 7 comprises commercial electricity and the fuel for the fuel cell means.

(2) The electricity generated by the fuel cell means 10 is supplied to the energy consumer.

(3) The heat generated by the fuel cell means 10 is supplied to the energy consumer as a heat source for the water bath and absorption heater/cooler.

(4) Electricity (4-1) 75% of the commercial electricity used is generated at a power plant using LNG as fuel. The calorific value of LNG is $13\times 10^6$ Kcal/ton. The gasified form of LNG is natural gas, The term LNG as used in this specification includes LNG and natural gas for expediency. A quantity of $CO_2$ generated is calculated by regarding LNG as methane.

(4-2) The overall efficiency of commercial electricity is 36% (= generating efficiency $0.4 \times$ transmitting efficiency 0.9).

(4-3) The performance coefficient of electrical cooling equipment is 2.5.

(4-4) To supply 1 kwh power, the power plant, with the calorific value of LNG at $13\times 10^6$ Kcal/ton $=13\times 10^6 \div 860=1.512\times 10^4$ kwh/ton, consumes LNG in the quantity of 1 kw $\div 0.36 \div (1.512\times 10^4)=1.837\times 10^{-4}$ tons, produces $CO_2$ in the quantity of $1.837\times 10^{-4}$ tons $\times 44/16=5.05\times 10^{-4}$ tons, and produces NOx in the quantity of $1.837\times 10^{-4}$ tons $\times 0.48\times 10^{-3}$ ton/ton $=8.82\times 10^{-8}$ tons.

Assuming that 75% of electricty is generated at an LNG thermal power plant, the above values become as follows:

LNG: $1.837\times 10^{-4}$ tons $\times 0.75=1.378\times 10^{-4}$ tons;
$CO_2$: $5.05\times 10^{-4}$ tons $\times 0.75=3.79\times 10^{-4}$ tons;
NOx: $8.82\times 10^{-8}$ tons $\times 0.75=6.62\times 10^{-8}$ tons $=6.62\times 10^{-5}$ kg.

(4-5) The unit price of commercial electricity is 15 yen/kwh.

(5) Fuel Cell Means (5-1) The performance coefficient of the absorption air-conditioner is 1.0.

(5-2) The fuel cell means is a phosphate type fuel cell with power generating efficiency at 40% and heat generating efficiency at 40%. In this embodiment, the efficiency is fixed regardless of load factor. However, the efficiency may be a function of load factor.

(5-3) LNG is used as fuel gas for the fuel cell means. Its unit price is 7.5 yen/kwh ($=96$ yen/m$^3$).

(5-4) To generate 1 kwh power, the fuel cell means consumes LNG in the quantity of 1 kwh $\div 0.4 \div (1.512\times 10^4)$ kwh/ton $=1.653\times 10^{-4}$ tons, and produces $CO_2$ in the quantity of $1.653\times 10^{-4}$ tons $\times 44/16=4.55\times 10^{-4}$ tons but does not produce NOx.

(6) Gas Boiler (6-1) To generate 1 kwh calorie, the gas boiler, with its thermal efficiency at 0.8, consumes LNG in the quantity of 1 kwh $\div 0.8 \div (1.512\times 10^4)$ kwh/ton $=8.27\times 10^{-5}$ tons, produces $CO_2$ in the quantity of $8.27\times 10^{-5}$ tons $\times 44/16=2.27\times 10^{-4}$ tons, and produces NOx in the quantity of $8.27\times 10^{-5}$ tons $\times 1.44\times 10^{-3}$ ton/ton $=1.191\times 10^{-7}$ tons $=11.91\times 10^{-5}$ kg.

FIRST COMPARATIVE EXPERIMENT

In the first experiment, the time period (12:00 to 13:00) which records a maximum power demand in the year was considered.

A consumer (total floor area: 2000 m$^2$) was assumed who consumed a total electric power of 180 kwh with a power load excluding space cooling (e.g. driving power, lighting and so on) at 144 kwh, a cooling power load at 36 kwh (corresponding to $36\times 2.5=90$ kwh in terms of space cooling), and a heat load for a warm water supply corresponding to 2 kwh (corresponding to $2\div 0.8=2.5$ kwh in terms of boiler input).

Environmental pollution was assessed with reference to NOx only.

In a comparative example for the first experiment, commercial electricity was used as the energy for the loads except space cooling (e.g. driving power, lighting and so on), a heat pump air-conditioner driven by commercial electricity was used for space cooling purposes, and a boiler fueled by town gas was used for warm water supplying and space heating purposes.

The cost "L" (yen) of using these energy sources is;

$$L=180\times 15+2.5\times 7.5=2720 \text{ (yen)}.$$

Tracing back to primary energy in this case, the quantity of fossil fuel (in terms of LNG) "M" (in tons) consumed in supplying the energy to be consumed in one hour is, since the heat energy generated from 1 ton of LNG is $1.512\times 10^4$(kwh/ton$-$LNG);

$$M=(180 \text{ kwh} \div 0.36\times 0.75+2.5)\div(1.512\times 10^4 \text{ kwh/ton}-LNG)=2.50\times 10^{-2}(ton-LNG).$$

Where environmental pollution is assessed with reference to NOx only, the quantity "N" of nitrogen oxides (NOx) released in the course of conversion from the primary energy, supply and consumption of these energy forms is, since nitrogen oxides (NOx) are released in $6.62\times 10^{-8}$(tons) when 1 kwh commercial electricity is generated, and the quantity of nitrogen oxides (NOx) in exhaust gas from the boiler fueled by town gas is $11.91\times 10^{-8}$ tons per kwh boiler output;

$$N=180\times6.62\times10^{-8}+2\times11.91\times10^{-8}=1.215\times10^{-5}(ton-NOx).$$

A dimensionless overall index providing the objective function for optimizing operating conditions may be obtained by substituting, in the foregoing expression $y=aXL+bXM+cXN$, the coefficients $a=4.0\times10^{-4}(1/yen)$, $b=80(1/ton)$ and $c=2.0\times10^4(1/ton)$, as follows:

$$y=4.0\times10^{-4}\times2719+80\times2.50\times10^{-2}+2.0\times10^4\times1.215\times10^{-5}=1.088+2.0+0.243=3.33.$$

In the energy supply system according to the present invention, on the other hand, an overall index is obtained as in the above case, using the amount of operation "x" (kwh) of the fuel cell means as a parameter. First, where $0<=x<=2$, the heat exhausted from the fuel cell means is used as part of the heat energy {corresponding to "x" (kwh)} for warm water supplying and space heating purposes, the boiler fueled by town gas is used for the remainder, and the electricity generated by the fuel cell means is used to cover the amount corresponding to "x" (kwh) in the power demand. The order in which the heat and electricity are generated by the fuel cell means is optional. It is assumed here that the heat generated by the fuel cell means is used first for the warm water supply and then for the space cooling, with the electric power used for purposes other than the space cooling.

The cost "L" (yen) of using these energy sources is;

$$L=(180-x)\times15+(2-x)\div0.8\times7.5+x\div0.7\times7.5-=2719-5.63x(yen).$$

Therefore, if $x=2$, the cost is 2710 yen.

Tracing back to primary energy, tile quantity of fossil fuel (in terms of LNG) "M" (in tons) consumed in supplying the energy to be consumed in one hour is;

$$M=\{(180-x)\div0.36\times0.75+(2-x)\div0.8+x/0.4\}\div(1.512\times10^4)=2.50\times10^{-2}-5.51\times10^{315}x.$$

Therefore, if $x=2$, the quantity is $2.50\times10^{-2}$.

The quantity "N" (in tons) of nitrogen oxides (NOx) released in the course of conversion from the primary energy, as well as supply and consumption of these energy forms is;

$$N=(180-x)\times6.62\times10^{-8}+(2-x)\times11.91\times10^{-8}-=1.215\times10^{-5}-1.853\times10^{-7}x.$$

Therefore, if $x=2$, the quantity is $1.178\times10^{-5}$.

A dimensionless overall index providing the objective function for optimizing operating conditions may be obtained, as in the preceding example, by substituting, in the expression $y=aXL+bXM+cXN$, the coefficients $a=4.0\times10^{-4}(1/yen)$, $b=80(1/ton)$ and $c=2.0\times10^4(1/ton)$, as follows:

$$y=3.33-0.01037x.$$

If $x=0$, $y=3.33$. If $x=2$, $y=3.31$.

Next, where $2<=x<=92$, the heat exhausted from the fuel cell means is used as sole heat energy for the warm water supplying and space heating purposes, the absorption heater/cooler driven by the exhaust heat from the fuel cell means to provide part of space cooling energy {(x−2)/2.5}, and the electric power generated by the fuel cell means is used to cover the amount corresponding to "x" (kwh) in the power demand.

The cost "L" (yen) of using these energy sources is;

$$L=\{(144-x)+35-(x-2)\div2.5\}\times15+x\div0.4\times7.5-=2712-2.25x\ (yen).$$

Therefore, if $x=2$, the cost is 2710 yen. If $x=92$, the cost is 2505 yen.

Tracing back to primary energy, the quantity of fossil fuel (in terms of LNG) "M" (in tons) consumed in supplying the energy to be consumed in one hour is;

$$M=[\{(144-x)+36-(x-2)\div2.5\}\div0.36\times0.75+x\div0.4]\div(1.512\times10^4)=2.49\times10^{-2}-2.76\times10^{-5}x.$$

Therefore, if $x=2$, the quantity is $2.48\times10^{-2}$. If $x=92$, the quantity is $2.24\times10^{-2}$.

The quantity "N" (in tons) of nitrogen oxides (NOx) released in the course of conversion from the primary energy, as well as supply and consumption of these energy forms is;

$$N=[\{(144-x)+36-(x-2)\div2.5\}\times6.62\times10^{-8}=1.197\times10^{-5}-9.27\times10^{-8}x.$$

Therefore, if $x=2$, the quantity is $1.178\times10^{-5}$. If $x=92$, the quantity is $3.44\times10^{-6}$.

A dimensionless overall index providing the objective function for optimizing operating conditions may be obtained, as in the preceding example, by substituting, in the expression $y=aXL+bXM+cXN$, the coefficients $a=4.0\times10^{-4}(1/yen)$, $b=80(1/ton)$ and $c=2.0\times10^4(1/ton)$, as follows:

$$y=3.32-4.96\times10^{-3}x.$$

If $x=2$, $y=3.31$. If $x=92$, $y=2.86$.

Next, where $92<=x<=144$, the heat exhausted from the fuel cell means is used as sole heat energy for the warm water supplying and space heating purposes, the absorption heater/cooler driven by the exhaust heat from the fuel cell means to provide all the space cooling energy, and the electric power generated by the fuel cell means is used to cover the amount corresponding to "x" (kwh) in the power demand. Superfluous exhaust energy is left unused.

The cost "L" (yen) of using these energy sources is;

$$L=(144-x)\times15+x\div0.4\times7.5=2160+3.75x(yen).$$

Therefore, if $x=92$, the cost is 2510 yen. If $x=144$, the cost is 2700 yen.

Tracing back to primary energy, the quantity of fossil fuel (in terms of LNG) "M" (in tons) consumed in supplying the energy to be consumed in one hour is;

$$M=\{(144-x)\div0.36\times0.75+x\div0.4\}\div(1.512\times10^4)-=1.984\times10^{-2}+2.76\times10^{-5}x.$$

Therefore, if $x=92$, the quantity is $2.24\times10^{-2}$. If $x=144$, the quantity is $2.38\times10^{-2}$.

The quantity "N" (in tons) of nitrogen oxides (NOx) released in the course of conversion from the primary energy, as well as supply and consumption of these energy forms is;

$$N=(144-x)\times6.62\times10^{-8}=9.53\times10^{-6}-6.62\times10^{-8}x.$$

Therefore, if $x=92$, the quantity is $3.44 \times 10^{-6}$. If $x=144$, the quantity is $-2.80 \times 10^{-9}$.

A dimensionless overall index providing the objective function for optimizing operating conditions may be obtained, as in the preceding example, by substituting, in the expression $y = aXL + bXM + cXN$, the coefficients $a = 4.0 \times 10^{-4}$(1/yen), $b = 80$(1/ton) and $c = 2.0 \times 10^4$(1/ton), as follows:

$$y = 2.64 + 2.38 \times 10^{-3} x.$$

If $x=92$, $y=2.86$. If $x=144$, $y=2.98$.

Figure 3:
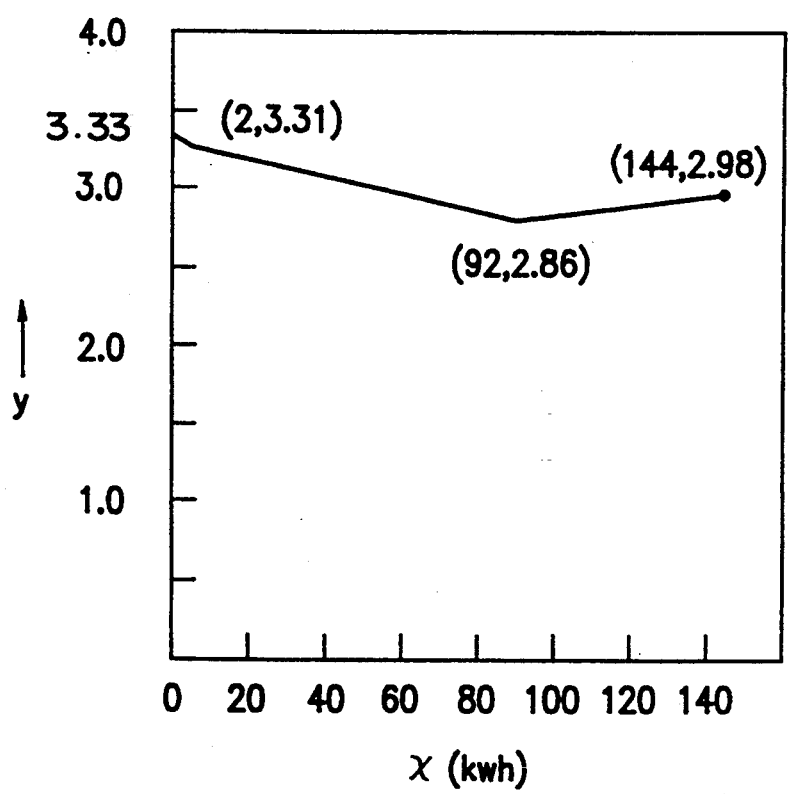
FIG. 3 is a graph showing a correlation between an overall index and an amount of operation of a fuel cell means.

FIG. 3 shows a graph plotted using the overall index for the range $x=0$ to 144 as function of "x".

It will be seen from the results that the expression "y" is minimized when $x=92$, i.e. in the condition in which the fuel cell is operated at 92 kwh to produce the exhaust heat just covering all the heat energy for warm water supplying and space heating purposes and tile space cooling energy. This condition is optimal.

The operation in this condition during the one hour from 12:00 to 13:00 produces the following results, in relation to the comparative example:

the energy cost is $2510 \div 2720 \times 100 = 92.3\%$, the quantity of fossil fuel is $2.24 \times 10^{-2} \div 2.50 \times 10^{-2} \times 100 = 89.6\%$, and the quantity of nitrogen oxides (NOx) is $3.44 \times 10^{-6} \div 1.215 \times 10^{-5} \times 100 = 28.3\%$.

Thus, this embodiment achieves reductions in the energy cost, primary energy and environmental pollutants.

SECOND COMPARATIVE EXPERIMENT

In the second comparative experiment, a day (in summer) which records a maximum power demand of the year was considered.

Figure 4:
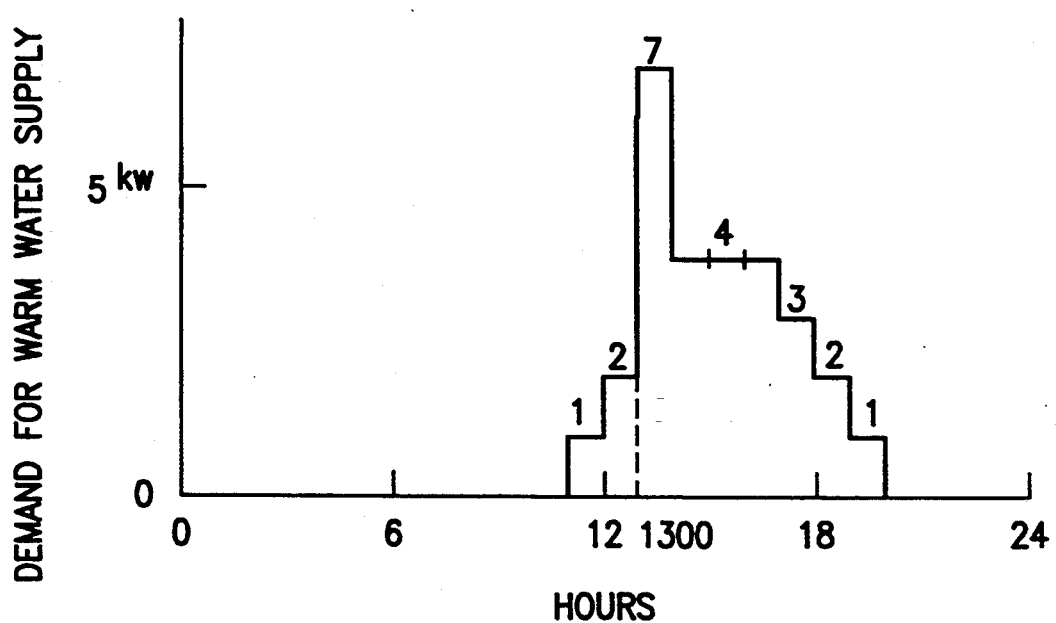
FIG. 4 is a graph showing a heat energy demand pattern in a comparative example.
Figure 5:
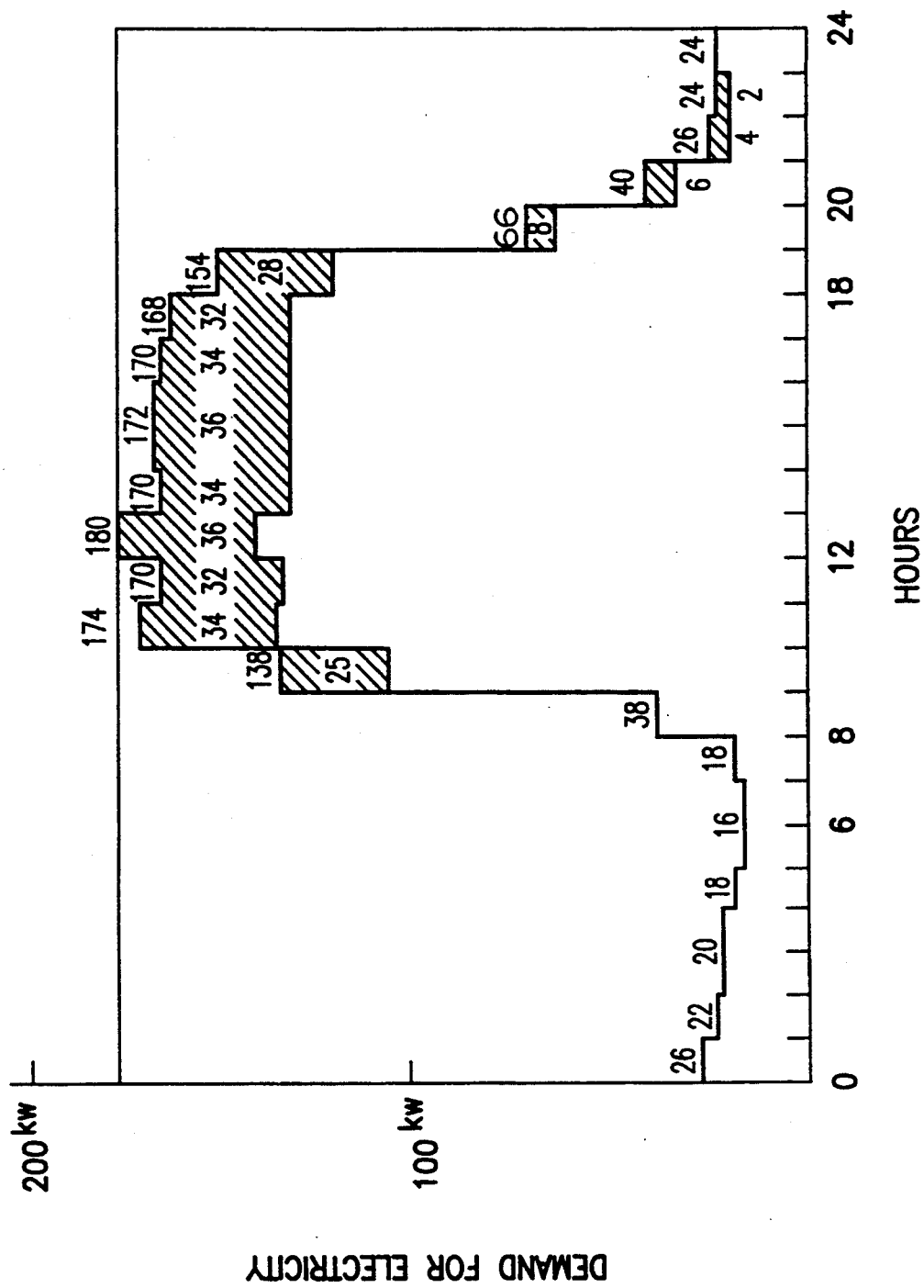
FIG. 5 is a graph showing electricity demand patterns in the comparative example.

FIG. 4 shows a demand pattern of heat energy for warm water supply on such a day. FIG. 5 shows demand patterns of electricity and of space cooling energy on the same day.

Figure 6:
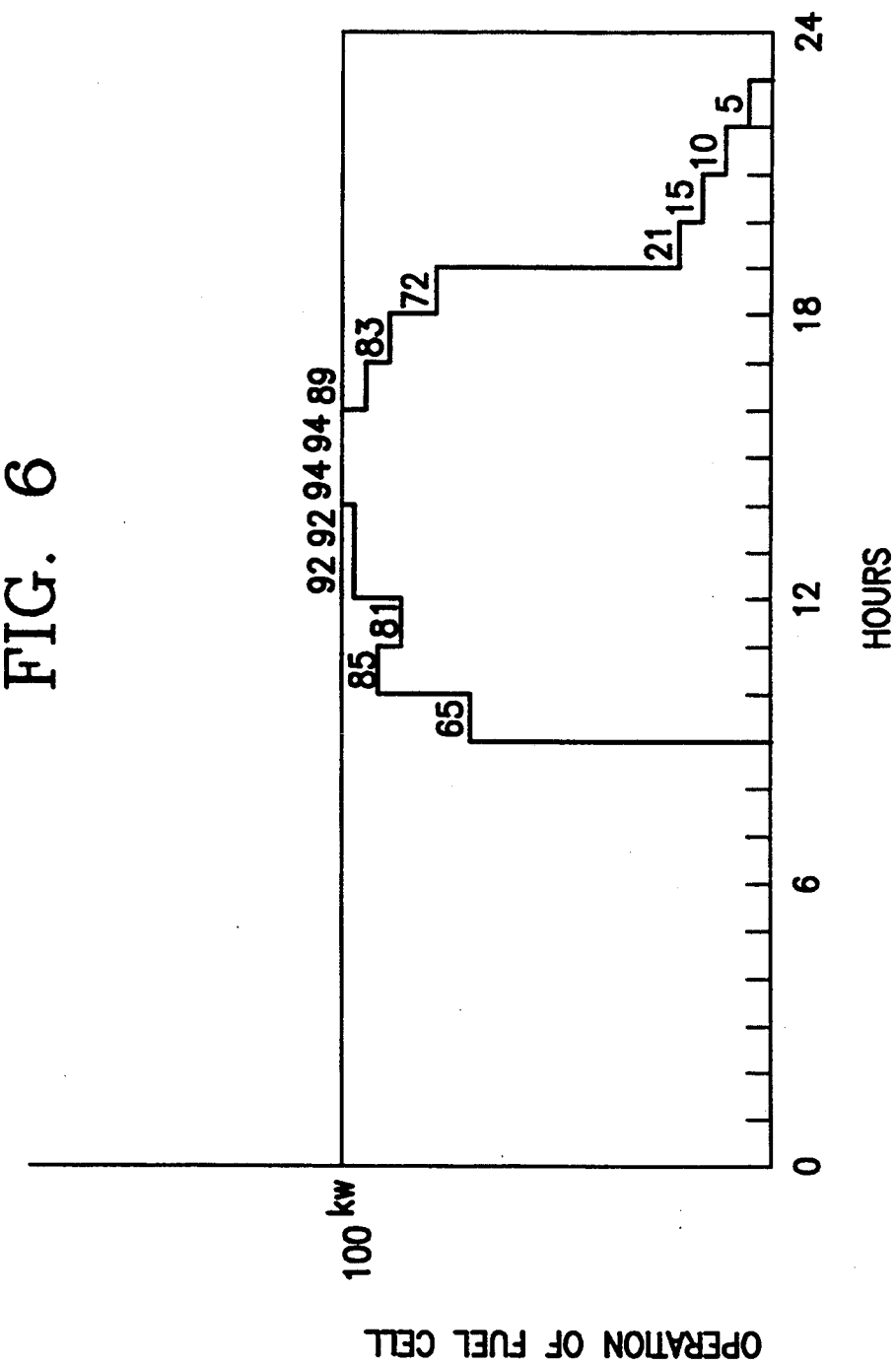
FIG. 6 is a graph showing an operating pattern of the fuel cell means.
Figure 7:
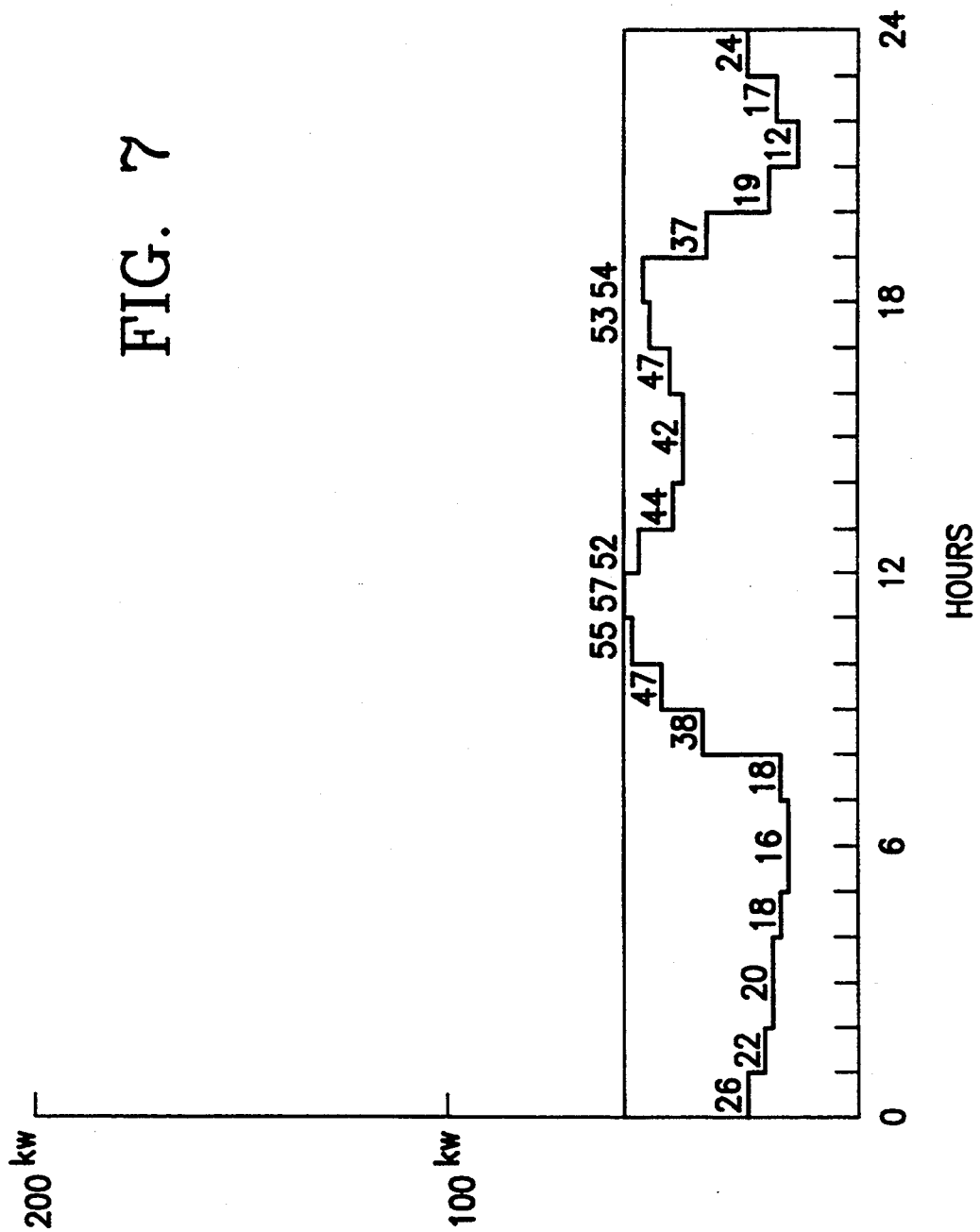
FIG. 7 is a graph showing a pattern of commercial electricity intake.

The cost "L" (yen) of using these energy sources in these patterns is;

$$L = 2042 \times 15 + 28 \div 0.8 \times 7.5 = 30900 (yen),$$

where "2042" is the electric power demand for the day derived from FIG. 7, and "28" is the heat demand for the day derived from FIG. 6, both in kwh.

Tracing back to primary energy in this case, the quantity of fossil fuel (in terms of LNG) "M" (in tons) consumed in supplying the energy to be consumed in one hour is;

$$M = (2042 \div 0.36 \times 0.75 + 28) \div (1.512 \times 10^4) = 0.283 \; (ton-LNG).$$

The quantity "N" (in tons) of nitrogen oxides (NOx) released in the course of conversion from the primary energy, supply and consumption of these energy forms is;

$$N = 2042 \times 6.62 \times 10^{-8} + 28 \times 11.91 \times 10^{-8} = 1.385 \times 10^{-4} (ton - NOx).$$

In the energy supply system according to the present invention, on the other hand, the operating condition of the fuel cell means was optimized in accordance with the energy demand patterns shown in FIGS. 4 and 5, by the same computing method as in the first comparative example. Results were obtained as shown in the fuel cell means operating pattern in FIG. 6 and the commercial electricity intake pattern in FIG. 7.

The cost "L" (yen) of using energy based on these patterns is;

$$L = 796 \times 15 + 898 \div 0.4 \times 7.5 = 28800 (yen).$$

Tracing back to primary energy, the quantity of fossil fuel (in terms of LNG) "M" (in tons) consumed in supplying the energy to be consumed in one hour is;

$$M = (796 \div 0.36 \times 0.75 + 898 \div 0.4) \div (1.512 \times 10^4) = 0.258.$$

The quantity "N" (in tons) of nitrogen oxides (NOx) released in the course of conversion from the primary energy, supply and consumption of these energy forms is;

$$N = 796 \times 6.62 \times 10^{-8} = 5.27 \times 10^{-5}.$$

These results show that on the day which records the maximum power demand of the year;

the energy cost is $28800 \div 30900 \times 100 = 93.2\%$, the quantity of fossil fuel is $0.258 \div 2.285 \times 100 = 91.2\%$, and the quantity of nitrogen oxides (NOx) is $5.27 \times 10^{-5} \div 1.385 \times 10^{-4} \times 100 = 38.1\%$, with respect to the comparative example. Titus, this embodiment achieves improvement in energy efficiency.

Since the maximum power intake is drastically reduced from 180 kwh to 57 kwh, the contract demand may be diminished from 200 kwh to 100 kwh. Moreover, the commercial electricity intake pattern is leveled to make a great contribution toward improvement in the availability factor of commercial electricity generating facilities.

In the described embodiment, LNG is used as primary energy. It is possible to use fossil energy derived from LNG, coal or petroleum, atomic energy from uranium, or hydraulic energy from hydropower generating plants, or a combination of some of these energy forms. In such a case, the cost of energy, the quantity of fuel in terms of LNG, and the quantities of $CO_2$ and NOx may be computed accordingly.

The foregoing embodiment may include a boiler or a cold nuclear fusion apparatus added to the system to act as an in-system heat generator for meeting heat shortages when the heat load of the heat consuming equipment is greater than tile heat generated by the in-system power generating means. Needless to say, a boiler is usable as an in-system heat generator. Fuels usable for the boiler include natural gas, town gas, heavy oil, light oil, coal and city waste. Tile boiler may be a heat recovery boiler provided for a city waste incinerator. The in-system heat generator may be a heat exchanger using, as a heat source, a warm fluid such as steam or warm water produced by a separate boiler. A cold nuclear fusion apparatus has been attracting attention since 1989 when Fleismann and Pons, and Jones et al reported cold nuclear fusion.

For example, PCT WO 90/10935 discloses a method and apparatus for generating a large quantity of heat by nuclear fusion. According to this publication, an electrolysis of heavy water is carried out using platinum or the like as the anode and palladium or the like as the cathode, wherein nuclear fusion is caused with a significant probability by filling the crystal lattice of palladium with heavy water atoms to make atomic nuclei of heavy water anomalously approach one another. The quantity of heat thereby generated exceeds the energy required for the electrolysis. Thus, a cold nuclear fusion apparatus may be used as a heat generator in the system according to the present invention.

In this way, a boiler or a cold nuclear fusion apparatus may be used to meet heat shortages when the heat load of the heat consuming equipment is greater than the heat generated by the in-system power generating means.

The heat derived from the boiler may be used when the heat load of the heat consuming equipment temporarily exceeds the heat generated by the in-system power generating means. The cold nuclear fusion apparatus may be used in the event of regular heat shortages.

Then, the heat obtained from the boiler or low nuclear fusion apparatus is supplemented when the heat demand temporarily increases and the heat load of the heat consuming equipment becomes greater than the heat available from the in-system power generating means. This is economical in that a small in-system power generating means is sufficient, instead of necessitating an in-system power generating means capable of meeting the maximum heat demand.

Setting of coefficients "a", "b" and "c" to the expression "y" (initial setting and setting changes) and operation controls may be provide or inputted from a central control unit means (central control room, central control panel or the like) through wiring such as an exclusive communication line, telephone line, power line or CATV, or by radio. Such controls include selection of energy consuming installations (power consuming equipment or heat consuming equipment) used by the energy consumer, energy selection (electricity or heat), load control, and control of varied devices such as valves.

This allows the coefficient setting and operation controls to be effected from a remote location, thereby controlling the system in a subtle and precise manner for its optimal operation.

An absorption heater/cooler may be installed adjacent the in-system power generating means, such as a cogeneration system using an engine or a turbine, a fuel cell means or the like, to use the heat power generating means by the in-system generator as a heat source. Warm or cold water or warm or cold air thereby produced may be supplied to the energy consumer through piping or ducting. This is merely a question of thermal conversion or location for installing or a thermal converter, and therefore is one form of the present invention.

The present invention may be embodied in other specific forms without departing from the spirit or essential attributes thereof and, accordingly, reference should be made to the appended claims, rather than to the foregoing specification, as indicating the scope of the invention.

What is claimed is:

1. An energy supply system comprising:
    power receiving means for receiving electric power from a power plant,
    fuel receiving means for receiving fuel,
    in-system power generating means for generating power and heat by using the fuel received at said fuel receiving means,
    power supplying means for supplying, in system interconnection, the power received at said power receiving means and the power generated by said in-system power generating means to a power consuming installation,
    heat supplying means for supplying the heat generated by the in-system power generating means to a heat consuming installation,
    computing means for computing operation load of said in-system power generating means to minimize an equation "y" set out hereunder when meeting an energy demand of an energy consumer; and
    control means for controlling said in-system power generating means to satisfy the operation load computed by said computing means;

$$y = aXL + bXM + cXN,$$

where "a", "b" and "c" are weighting coefficients $a \geq 0$, $b \geq 0$ and $c \geq 0$, which do not become zero at the same time and do not become $a>0$, $b=0$ and $c=0$ at the same time, where:
    "L" is an energy cost borne by the energy consumer when said energy demand is met,
    "M" is a calculated total quantity of primary energy including energy consumed by said power plant and said in-system power generating means to meet said energy demand, and
    "N" is a calculated total quantity of environmental pollutants released at least by said power plant and said in-system generating means when said energy demand is met, and
    means for inputting values for L, M and N to said computing mean.

2. An energy supply system as defined in claim 1, further comprising an in-system heat generating means besides said in-system power generating means, wherein heat generated by said in-system heat generating means also is supplied to said heat consuming installation.

3. An energy supply system as defined in claim 1, further comprising combustible gas receiving means for receiving combustible gas and supplying said combustible gas to a customer heat consuming installation so that said customer heat consuming installation can use, as a heat source, said combustible gas from said receiving means, said power or said heat, and said energy demand includes an energy demand of said customer heat consuming installation.

4. An energy supply system as defined in claim 1, wherein said equation "y" is in form of $y = a \times L + b \times N$, where $a>0$ and $b>0$ and $c=0$.

5. An energy supply system as defined in claim 1, wherein said equation "y" is in form of $y = b \times M$, where $a=0$ and $c=0$.

6. An energy supply system as defined in claim 1, wherein said equation "y" is in form of $y = c \times N$, where $a=0$ and $b=0$.

7. An energy supply system as defined in claim 1, wherein said in-system power generating means includes at least a fuel cell means for generating electricity through a reaction between hydrogen and oxygen.

8. An energy supply system as defined in claim 1, further comprising heat storage means for storing superfluous heat generated by said in-system power generating means, and heat replenishment means for supplying the heat stored in said storage means to said heat consuming installation.

9. An energy supply system as defined in claim 1, further comprising electricity-to-heat converting means operable, when the heat load of said heat consuming installation is greater than a quantity of heat produced from said in-system power generating means, to compensate for a heat shortage with thermal conversion of superfluous power.

10. An energy supply system as defined in claim 1, further comprising power storage means for storing part of the power supplied from said power receiving means or part of the power generated by said in-system power generating means at a time of low power demand, and power replenishment means for supplying the power stored in said power storage means to said power consuming installation.

11. An energy supply system as defined in claim 1, further comprising gas storage means for storing at least hydrogen gas generated along with oxygen gas through an electrolysis of water carried out by using superfluous power.

12. An energy supply system as defined in claim 1, further comprising back-current means for causing a back current of part of the power generated by said in-system power generating means when the power generated by said in-system power generating means exceeds a power demand.

13. An energy supply system as defined in claim 1, further comprising reform means for producing hydrogen gas from a hydrocarbon fuel received at said fuel receiving means.

14. An energy supply system as defined in claim 1, further comprising a solar cell connected to said power consuming installation.

15. An energy supply system as defined in claim 2, further comprising combustible gas receiving means for receiving combustible gas and supplying said combustible gas to a customer heat consuming installation so that said customer heat consuming installation can use, as a heat source, said combustible gas from said receiving means, said power or said heat, and said energy demand includes an energy demand of said customer heat consuming installation.

16. An energy supply system as defined in claim 2, wherein said in-system power generating means includes at least a fuel cell means for generating electricity through a reaction between hydrogen and oxygen.

17. An energy supply system as defined in claim 2, further comprising heat storage means for storing superfluous heat generated by said in-system power generating means, and heat replenishment means for supplying the heat stored in said storage means to said heat consuming installation.

18. An energy supply system as defined in claim 2, further comprising electricity-to-heat converting means operable, when the heat load of said heat consuming installation is greater than a quantity of heat produced from said in-system power generating means, to compensate for a heat shortage with thermal conversion of superfluous power.

19. An energy supply system as defined in claim 2, further comprising power storage means for storing part of the power supplied from said power receiving means or part of the power generated by said in-system power generating means at a time of low power demand, and power replenishment means for supplying the power stored in said power storage means to said power consuming installation.

20. An energy supply system as defined in claim 2, further comprising gas storage means for storing at least hydrogen gas generated along with oxygen gas through an electrolysis of water carried out by using superfluous power.

21. An energy supply system as defined in claim 2, further comprising back-current means for causing a back current of part of the power generated by said in-system power generating means when the power generated by said in-system power generating means exceeds a power demand.

22. An energy supply system as defined in claim 2, further comprising reform means for producing hydrogen gas from a hydrocarbon fuel received at said fuel receiving means.

23. An energy supply system as defined in claim 2, further comprising a solar cell connected to said power consuming installation.

24. An energy supply system as defined in claim 4, wherein said in-system power generating means includes at least a fuel cell means for generating electricity through a reaction between hydrogen and oxygen.

25. An energy supply system as defined in claim 4, further comprising heat storage means for storing superfluous heat generated by said in-system power generating means, and heat replenishment means for supplying the heat stored in said storage means to said heat consuming installation.

26. An energy supply system as defined in claim 4, further comprising electricity-to-heat converting means operable, when the heat load of said heat consuming installation is greater than a quantity of heat produced from said in-system power generating means, to compensate for a heat shortage with thermal conversion of superfluous power.

27. An energy supply system as defined in claim 4, further comprising power storage means for storing part of the power supplied from said power receiving means or part of the power generated by said in-system power generating means at a time of low power demand, and power replenishment means for supplying the power stored in said power storage means to said power consuming installation.

28. An energy supply system as defined in claim 4, further comprising gas storage means for storing at least hydrogen gas generated along with oxygen gas through an electrolysis of water carried out by using superfluous power.

29. An energy supply system as defined in claim 4, further comprising back-current means for causing a back current of part of the power generated by said in-system power generating means when the power generated by said in-system power generating means exceeds a power demand.

30. An energy supply system as defined in claim 4, further comprising reform means for producing hydrogen gas from a hydrocarbon fuel received at said fuel receiving means.

31. An energy supply system as defined in claim 4, further comprising a solar cell connected to said power consuming installation.

32. An energy supply system as defined in claim 5, wherein said in-system power generating means includes at least a fuel cell means for generating electricity through a reaction between hydrogen and oxygen.

33. An energy supply system as defined in claim 5, further comprising heat storage means for storing superfluous heat generated by said in-system power generating means, and heat replenishment means for supplying the heat stored in said storage means to said heat consuming installation.

34. An energy supply system as defined in claim 5, further comprising electricity-to-heat converting means operable, when the heat load of said heat consuming installation is greater than a quantity of heat produced from said in-system power generating means, to compensate for a heat shortage with thermal conversion of superfluous power.

35. An energy supply system as defined in claim 5, further comprising power storage means for storing part of the power supplied from said power receiving means or part of the power generated by said in-system power generating means at a time of low power demand, and power replenishment means for supplying the power stored in said power storage means to said power consuming installation.

36. An energy supply system as defined in claim 5, further comprising gas storage means for storing at least hydrogen gas generated along with oxygen gas through an electrolysis of water carried out by using superfluous power.

37. An energy supply system as defined in claim 5, further comprising back-current means for causing a back current of part of the power generated by said in-system power generating means when the power generated by said in-system power generating means exceeds a power demand.

38. An energy supply system as defined in claim 5, further comprising reform means for producing hydrogen gas from a hydrocarbon fuel received at said fuel receiving device.

39. An energy supply system as defined in claim 5, further comprising a solar cell connected to said power consuming installation.

40. An energy supply system as defined in claim 6, wherein said in-system power generating means includes at least a fuel cell means for generating electricity through a reaction between hydrogen and oxygen.

41. An energy supply system as defined in claim 6, further comprising heat storage means for storing superfluous heat generated by said in-system power generating means, and heat replenishment means for supplying the heat stored in said storage means to said heat consuming installation.

42. An energy supply system as defined in claim 6, further comprising electricity-to-heat converting means operable, when the heat load of said heat consuming installation is greater than a quantity of heat produced from said in-system power generating means, to compensate for a heat shortage with thermal conversion of superfluous power.

43. An energy supply system as defined in claim 6, further comprising power storage means for storing part of the power supplied from said power receiving means or part of the power generated by said in-system power generating means at a time of low power demand, and power replenishment means for supplying the power stored in said power storage means to said power consuming installation.

44. An energy supply system as defined in claim 6, further comprising gas storage means for storing at least hydrogen gas generated along with oxygen gas through an electrolysis of water carried out by using superfluous power.

45. An energy supply system as defined in claim 6, further comprising back-current means for causing a back current of part of the power generated by said in-system power generating means when the power generated by said in-system power generating means exceeds a power demand.

46. An energy supply system as defined in claim 6, further comprising reform means for producing hydrogen gas from a hydrocarbon fuel received at said fuel receiving means.

47. An energy supply system as defined in claim 6, further comprising a solar cell connected to said power consuming installation.

* * * * *